United States Patent [19]

Thomas

[11] Patent Number: 5,436,548
[45] Date of Patent: Jul. 25, 1995

[54] BATTERY CHARGING AND DISCHARGING SYSTEM AND CORRESPONDING METHOD

[75] Inventor: George Thomas, Plantation, Fla.

[73] Assignee: Motorola, Inc., Schaumburg, Ill.

[21] Appl. No.: 981,463

[22] Filed: Nov. 25, 1992

[51] Int. Cl.6 .................. H01M 10/44; H01M 10/46
[52] U.S. Cl. ...................................................... 320/2
[58] Field of Search ................ 320/2, 21, 48, 12, 13, 320/30; 429/104

[56] References Cited

U.S. PATENT DOCUMENTS

| | | | |
|---|---|---|---|
| 3,852,652 | 12/1974 | Jasinski | 320/35 |
| 3,907,603 | 9/1975 | Kocherginsky et al. | 136/140 |
| 3,923,550 | 12/1975 | Von Krusenstierna | 136/165 |
| 3,925,098 | 12/1975 | Saunders et al. | |
| 3,963,976 | 6/1976 | Clark | 320/21 |
| 4,015,053 | 3/1977 | Von Kursenstierna | 429/49 |
| 4,302,714 | 11/1981 | Yefsky | 320/5 |
| 4,329,406 | 5/1982 | Dahl et al. | 320/48 X |
| 4,388,583 | 6/1983 | Krueger | 320/46 |
| 4,636,741 | 1/1987 | Mitzlaff | 455/89 X |
| 4,728,877 | 3/1988 | Adamson | 320/21 |
| 5,115,182 | 5/1992 | Ehmke et al. | 320/14 |
| 5,360,680 | 11/1994 | Goldman et al. | |
| 5,378,551 | 1/1995 | Meadows et al. | |

FOREIGN PATENT DOCUMENTS

| | | |
|---|---|---|
| 57-180878 | of 1982 | Japan . |
| 4-274175 | of 1992 | Japan . |
| 995163 | of 0000 | U.S.S.R. . |

*Primary Examiner*—Thomas M. Dougherty
*Assistant Examiner*—E. D. Tso
*Attorney, Agent, or Firm*—Dale W. Dorinski

[57] ABSTRACT

A system for charging a battery (100) includes a power supply (200) and a vibrating mechanism (210). The power supply provides current to the battery in order to charge the battery while the vibrating mechanism simultaneously vibrates the battery to increase the deliverable capacity of the battery. A system for discharging a battery includes an electrical load (300) and a vibrating mechanism (210). The load is electrically connected to the battery and the vibrating mechanism vibrates the battery while the battery is being discharged.

20 Claims, 5 Drawing Sheets

BATTERY CHARGING AND DISCHARGING SYSTEM AND CORRESPONDING METHOD

TECHNICAL FIELD

This invention relates generally to electrical systems and corresponding methods pertaining to the charging and/or discharging of one or more batteries, and more particularly, to systems and methods for improving the rate capability of a battery during the charging and discharging cycles.

BACKGROUND

Rechargeable sealed batteries require apparatus and methods for rapid recharging. In general, a rapid charge is considered to be any current equal to, or in excess of, the nominal one-hour current rating of the battery or cell. The nominal one-hour rating is generally referred to as the "capacity" (C). Capacity is more specifically defined as the nominal rate of discharge current for one hour, to a selected voltage, such as one volt per cell. For example, a cell normally rated at 1.5 ampere-hours has a C rating of 1.5 amps. Thus, any charging current applied to the cell which is in excess of 1.5 amps is considered to be a rapid charging current. In contrast, slow or trickle charging is generally considered to be any currents less than C, typically in the neighborhood of 0.1 C to 0.5 C.

Rechargeable batteries may be charged at many rates varying from trickle charging rates such as 0.1 C to extremely rapid charging rates as high as 10 C. Users of rechargeable batteries would prefer that the battery provide maximum capacity and minimum recharge time. To this extent, high rates of charging batteries are desirable. Unfortunately, the deliverable capacity of a battery cell is reduced as the charging rate is increased. FIG. 1 shows the relationship between deliverable capacity and charging rate.

As a result, a compromise is typically struck between the deliverable capacity of a battery and the recharging rate. Typically, this compromise results in charge rates of 0.2 C–1.0 C in order to provide the highest possible usable capacity while still maintaining a reasonable recharge time. A method of providing high deliverable capacity and very short recharging times, that is, recharge rates greater than C, would be highly desirable and a significant contribution to the art. Users of rechargeable batteries would find such a method to be a significant improvement over the prior art.

SUMMARY OF THE INVENTION

Briefly, according to the invention, there is provided a system for charging a battery. The system includes a power supply and a vibrating mechanism. The power supply provides current to the battery in order to charge the battery while the vibrating mechanism simultaneously vibrates the battery to improve the deliverable capacity of the battery.

In another embodiment of the invention, a system for discharging a battery includes an electrical load and a vibrating mechanism. The load is electrically connected to the battery and the vibrating mechanism simultaneously vibrates the battery while the battery is being discharged.

Additional embodiments of the invention include methods for charging and discharging a battery while vibrating the battery to increase the deliverable capacity.

DETAILED DESCRIPTION OF THE PREFERRED EMBODIMENT

Figure 1:
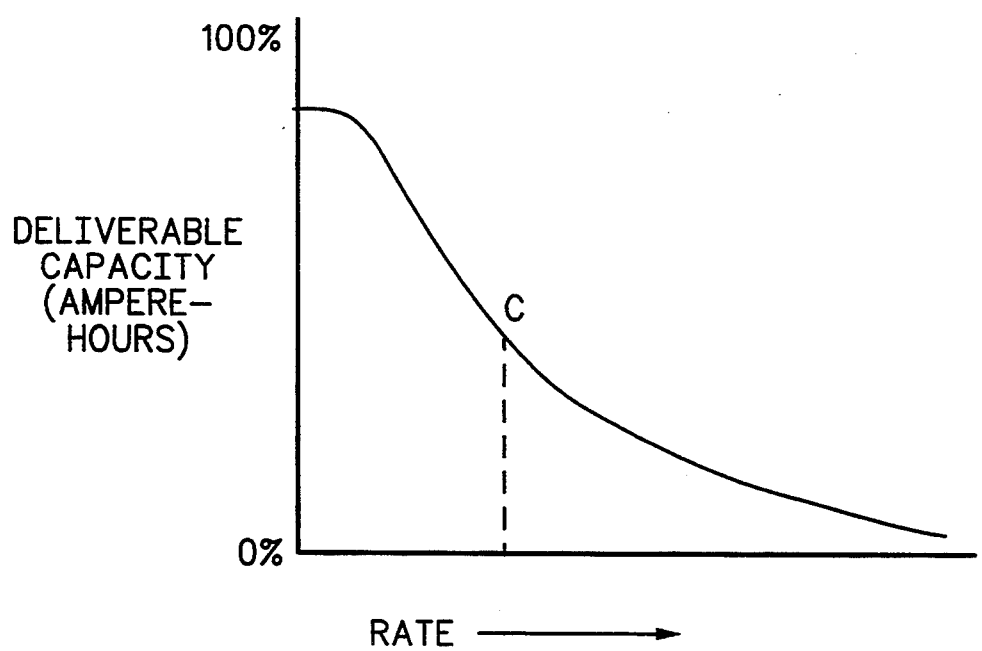
FIG. 1 is a graph showing the relationship between deliverable capacity of a battery as a function of the rate of charging according to the prior art.

A description of the invention is now presented, and is best understood from a consideration of the following text in conjunction with the drawing figures, in which like reference numerals are carried forward. The terms "battery" and "cell" are used herein interchangeably, and the term "battery package" is used to describe two or more cells connected together.

Figure 2:
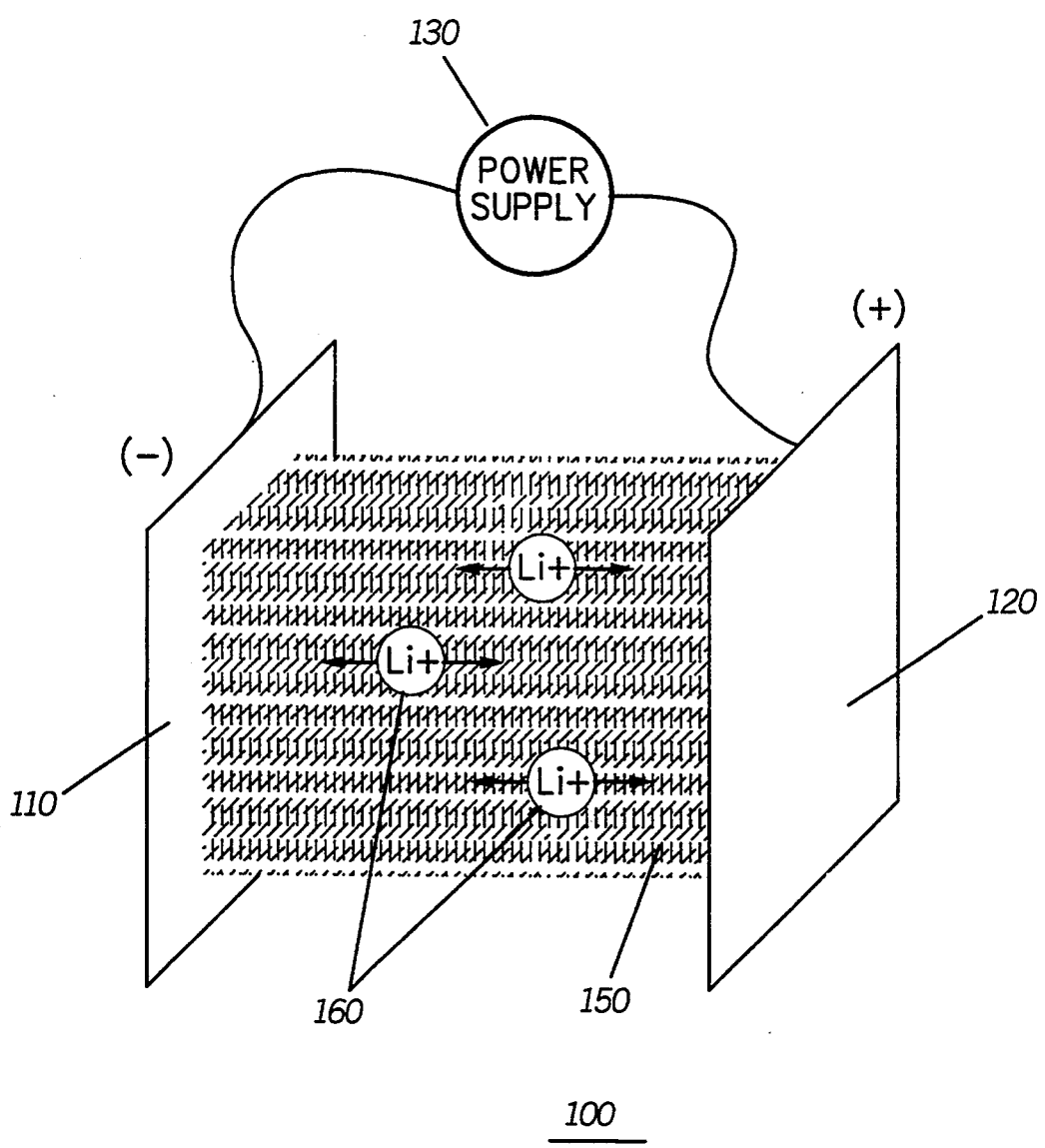
FIG. 2 is a schematic representation of a battery cell.

Referring now to FIG. 2, a schematic view of a rechargeable battery during the charge cycle is shown. A battery or electrochemical cell 100 has a negative electrode or anode 110 and a positive electrode or cathode 120. An electrolyte 150 provides electrical connection between the anode 110 and the cathode 120. The battery 100 is further connected to receive a charging current from a power supply 130. The power supply 130 can be any number of different types of supplies, for example, one or more charged batteries, a source of AC current, a source of DC current (such as might be provided from a transformer), or other types of power supplies. During the charging process, a positive ion 160 is liberated from the cathode and migrates through the electrolyte 150 to be deposited on the anode 120, and the reverse is true during a discharge cycle. The charging system and method of the present invention is applicable to all types of rechargeable batteries, for example, lead acid, NiCd, lithium, nickel metal hydride, etc., but is most preferably adaptable for use on batteries where the electrolyte 150 is a solid state or polymeric material. Typically, in these batteries, the positive ion 160 is a lithium ion. In order for the battery 100 to become charged, lithium ions 160 must migrate through the solid state polymer electrolyte 150 from the cathode 120 to the anode 110. Although the anode and cathode are in close proximity, the very fact that the electrolyte 150 is a solid material inhibits the free and rapid migration of the lithium ions 160 to the cathode or anode during charge/discharge cycles. In systems where the electrolyte 150 is a liquid such as in lead acid batteries, the migration of the positive ions 160 are much more rapid and uniform.

The speed of migration of the positive ions 160 through the electrolyte 150 is a direct function of the ion conductivity of the electrolyte which, in turn, determines the battery charging rate C. The rate of diffusion of the ion within the electrodes also limits the charge/discharge rate in batteries. Because the mass transport rate of the positive ion 160 is limited by the matrix of the electrolyte 150, the effective upper value of C is limited, and is typically much smaller in solid state batteries than in other types of batteries. Diffusion of ions is the only means of mass transport available in these types of batteries. The speed of mass transport may be altered by changing the diffusion rate, for example, increasing the temperature or providing forced convection mass transfer. Increasing the temperature adds more energy to the system, thereby increasing the rate of mass transfer. However, other inefficiencies are experienced at the electrodes as temperatures are increased, thereby negating the positive effects experienced by increasing mass transfer. Mass transfer can also be increased by applying forced convection methods to the electrolyte such as stirring or agitation.

Forced convection by agitation has been used in the electroplating industry to provide greater efficiency, smoother plating, and higher plating rates by agitating the anode, the cathode, the electrolyte, or combinations of these three. Since rechargeable batteries are typically sealed, the use of forced convention, such as stirring or agitation, of the electrolyte is difficult if not impossible to implement. In addition, the solid state electrolyte found in certain types of batteries also prevents stirring or agitation. This results in the sole dependence of diffusion for ionic or mass transport in the electrolyte and/or electrodes during the charging and discharging processes.

Referring now to FIG. 1, it can been seen that deliverable capacity of a battery decreases as the charge rate increases. In order to attain the rated deliverable capacity of a battery, the charging rate should be less than 1 C, typically 0.1 to 0.5 C in solid state batteries. For charge rates in excess of C, it can be seen that the deliverable capacity of the battery is between ten and fifty percent of the rated capacity. For example, if one were to charge a battery at 5 C, one would only realize a fraction of the battery's capacity. By using forced convection, the shape and position of the curve in FIG. 1 is altered so that high charge rates now provide high deliverable capacity.

In the preferred embodiment of the invention, the battery is vibrated, preferably at ultrasonic frequencies, in order to provide the needed means for convective mass transport. Vibration at ultrasonic frequencies, that is, frequencies in excess of 20,000 Hz, is effected by means of an ultrasonic transducer. During the charging process, ultrasonic vibration of the battery increases the mass transport rate of the primary ions (for example, lithium ions in a lithium battery), across the electrolyte from one electrode to another, and also within each electrode. The resulting smoother plating and more efficient deposition of the positive ion on the anode creates a more efficient electrode. The higher mass transport rate also translates into a considerable increase in the rate capability of a battery which thereby considerably decreases the charging time of that battery.

Figure 3:
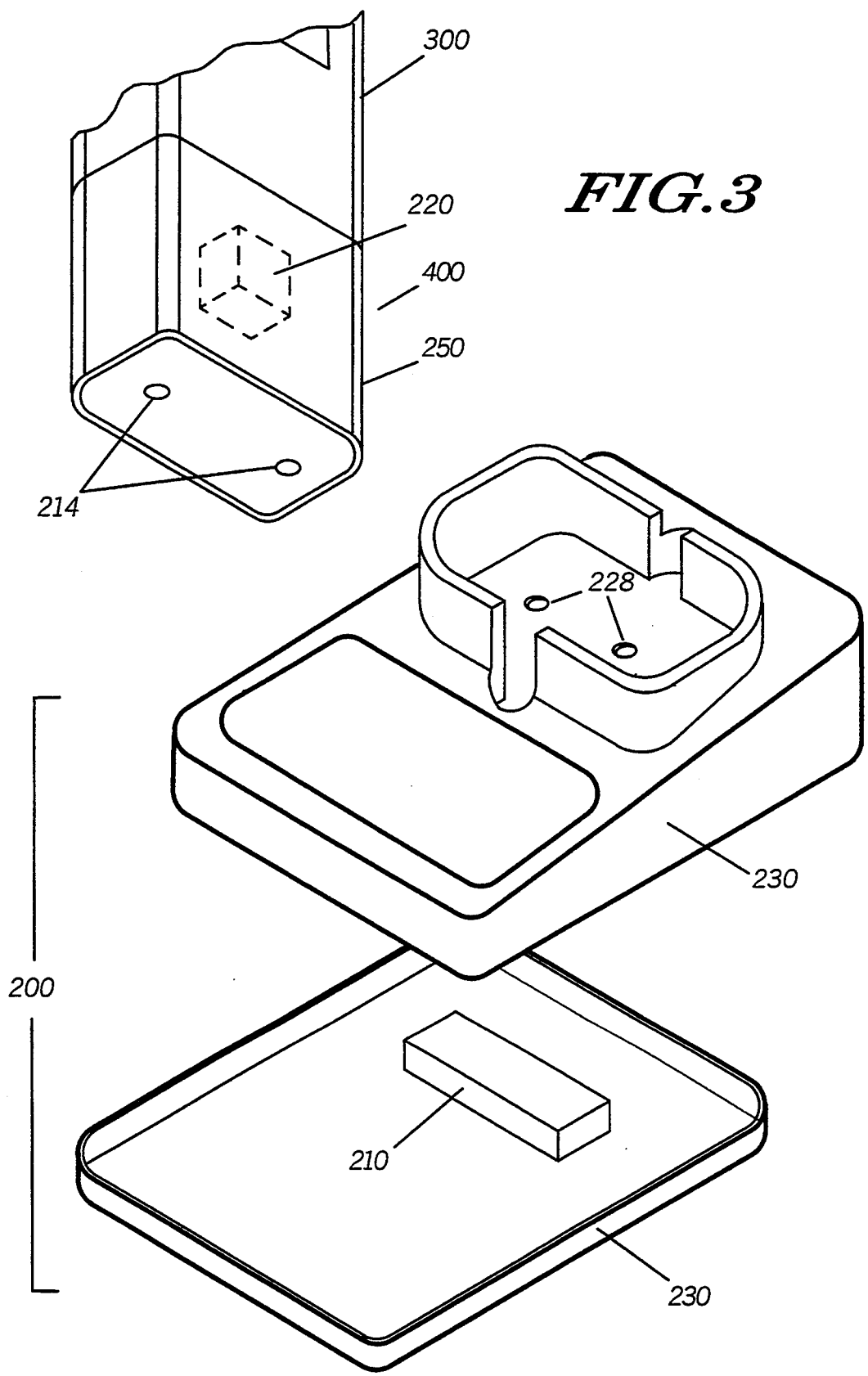
FIG. 3 is a representation of a battery charging system in accordance with the invention.

Referring now to FIG. 3, the battery package 400 is electrically connected to a power supply 200 that provides a charging current to the battery package through electrical contacts 228 and 214. While the charging current is being applied to the battery package 400, it is vibrated by a vibrating means 210, for example, an ultrasonic transducer. The vibrating means 210 is located in the power supply 200. For example, if the power supply 200 is a battery charger, the charger may contain an ultrasonic transducer in the charger housing 230. Other sources of vibration provided by various mechanical methods at lower or higher frequencies, may also be used, such as "reed" type vibrators, pancake motors, coils with electromagnet pins in the center (similar to a solenoid coil), or eccentric cams. For example, the vibrator may be located within the charger housing to provide a low frequency vibration to the battery during the charging cycle.

In another embodiment, the source of vibration or vibrating means 220 may be located in the battery package 400. For example, a battery package 400 containing one or more battery cells in a housing 250 includes a small transducer or other source of vibration 220 that, when coupled to the power supply or battery charger 200, provides power to vibrate the battery package 400.

It has also been found that the usable capacity of a battery is also increased if the battery is vibrated during the discharge cycle. In this case, the mechanism is similar to but opposite of what we find in the charging cycle, that is, the lithium ion migrates from the anode to the cathode in a much more uniform and rapid manner as opposed to conventional systems where diffusion is the only mechanism. Forced convection of the ion during discharge results in a more efficient use of the electrical energy stored in the cells. As in the charging scheme, the source of the vibration may be located either in the battery package itself or in a load or electrical device 300 that is being powered by the battery. The load may be, for example, a radio transmitter, electric vehicle, or other type of electric load that consumes electric power at varying rates. Other loads connected to the battery may be other types of electrical devices, such as resistive loads or active loads. Examples of loads suitable for use with the invention would be consumer electronics, portable computers, portable radios, portable lights, etc. Depending on the type of application, the vibrator might be actuated whenever the device or load is turned on, or be actuated only when the amount of current being withdrawn from the battery meets or exceeds a predetermined rate, such as the rated capacity. For example, when an electric vehicle is drawing a large amount of current during acceleration, the battery would be vibrated to increase the mass transport rate of the ion, thereby increasing the usable capacity of the battery.

Figure 4:
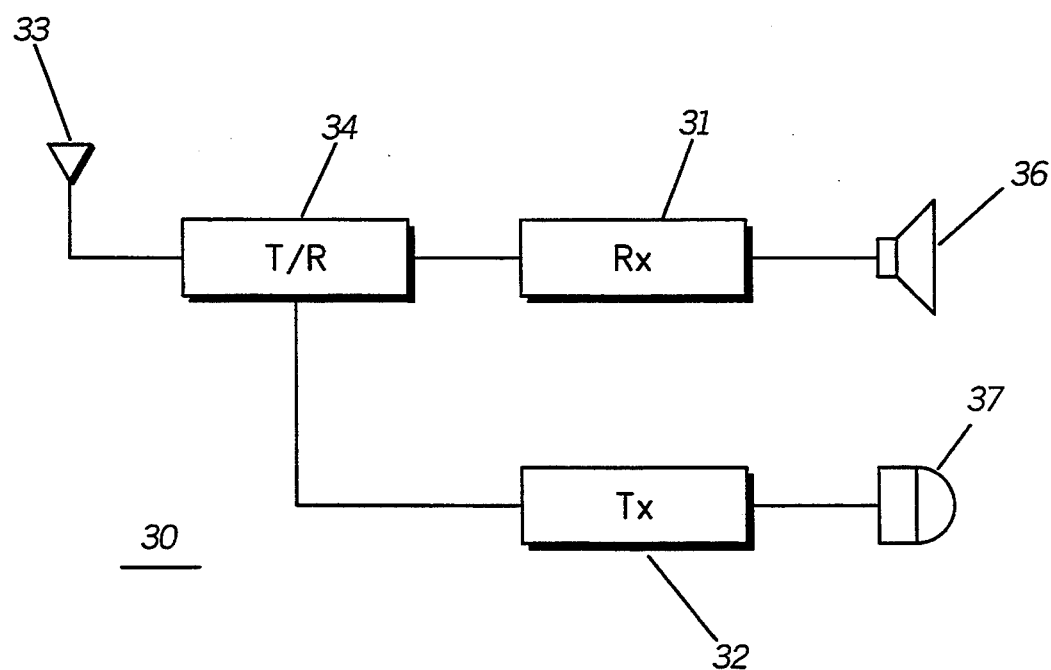
FIG. 4 is a schematic diagram of a radio in accordance with the invention.

In another embodiment of the invention, the battery package as described herein may find particular use in portable communications applications. Referring to FIG. 4, the battery package of the present invention powers a radio 30 comprising any well-known radio, such as portable two-way radios manufactured by Motorola Inc., which may operate in either receive or transmit modes. The radio 30 includes a receiver section 31 and a transmitter section 32 which comprise means for communicating, that is, transmitting or receiving communication signals for the radio.

In the receive mode, the portable radio 30 receives a communication signal via an antenna 33. A transmit/receive (T/R) switch 34 couples the received communication signal to the receiver 31. The receiver 31 receives and demodulates the received communications signal and presents its audio component to a speaker 36. It may be appreciated by one of ordinary skill in the art that other functions not herein described may be provided by any suitable means, including a controller means (not shown), which controls the entire operation of the radio 30.

In the transmit mode, audio messages are coupled from a microphone 37, where they are used to modulate a carrier signal as is well known in the art. The modulated carrier signal is then applied to the antenna 33 through the T/R switch 34 for transmission of the communication signal. It may be appreciated that the battery package, according to the principals of the present invention, may be coupled to the radio 30 to provide a source of electricity.

An example of a system and method for charging a battery in order to realize increased deliverable capacity will now be disclosed.

EXAMPLE

Figure 5:
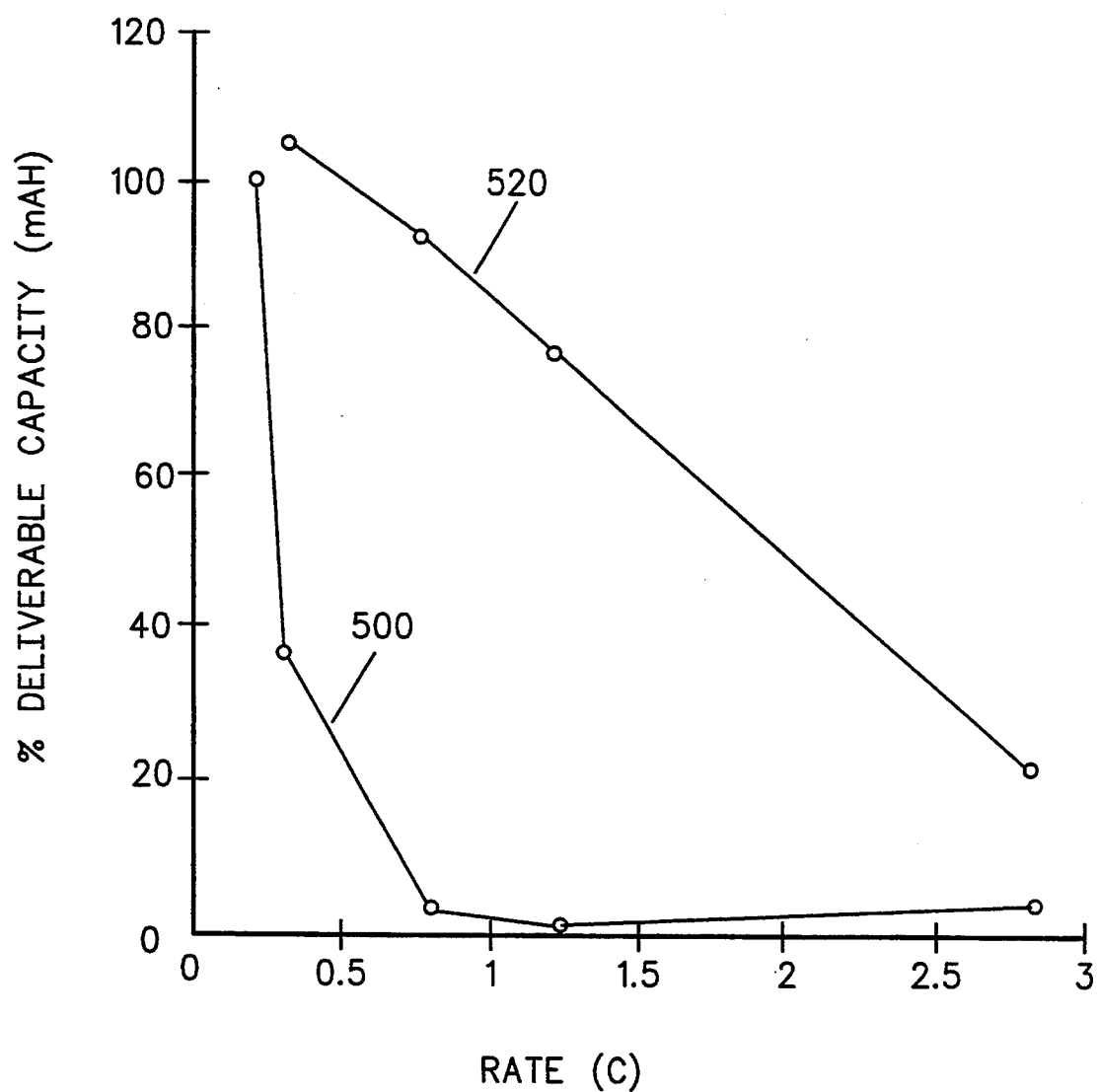
FIG. 5 shows examples of deliverable capacity of batteries charged in accordance with the invention.

An "AA" cell from the Asahi Chemical Company was charged. The AA cell was a lithium ion battery with carbon electrodes, rated at 350 milliampere-hours. A computer-controlled, high-resolution, battery cycle tester was used to charge and discharge the battery. An applied voltage between 2.5 and 4.2 volts was used and data on the state of charge on the battery was collected every ten minutes. Charging currents ranging from 50 milliamperes to 1000 milliamperes were used to establish values for a "control." The battery was then connected to the computer-controlled charger and positioned in an ultrasonic cleaner, operating at a frequency of 31 KHz (manufactured by Faber-Castell Corporation, Model No. 9999B). The battery was charged with the ultrasonic assist at various charging currents. All tests were conducted at room temperature. FIG. 5 shows the results of the tests.

In conventional charging and discharging schemes, capacity decreases with increasing current or increasing charge rate. Curve 500 in FIG. 5 shows the effect of capacity decrease as a function of increasing charge/discharge rate for cells cycled at rates of 50, 100, 500, and 1000 milliamperes. Curve 520 shows the results of the test at cycling rates of 100, 200 and 300 milliamperes with ultrasonic agitation of the battery. Over 100% increase in the usable capacity or deliverable capacity of the battery is seen. It is postulated that this increase in deliverable capacity is due to the increase in mass transport of the positive ion through the electrolyte and electrodes. The use of forced convection increases the number of lithium ions available to be deposited on the electrode and also increases the efficiency of the deposition process. This, in turn, raises the deliverable capacity of the battery.

It will be readily appreciated by one skilled in the art that increasing the usable capacity of a battery is advantageous, and it will be further appreciated that obtaining this increase at a high rate of charge is an even more significant advantage. The use of ultrasonic agitation provides a significant advantage over the prior art by increasing the deliverable capacity of rechargeable battery cells.

While the preferred embodiments of the invention have been illustrated and described, it will be clear that the invention is not so limited. Numerous modifications, changes, variations, substitutions and equivalents will occur to those skilled in the art without departing from the spirit and scope of the present invention. Accordingly, it is intended that the present invention not be limited except as by the appended claims.

What is claimed is:

1. A battery charging system, comprising:
   a rechargeable battery having a solid state electrolyte;
   a power supply electrically connected to the rechargeable battery for charging the rechargeable battery;
   means for vibrating the rechargeable battery, electrically connected to the power supply and located in the rechargeable battery; and
   the power supply simultaneously charging the battery and actuating the means for vibrating.

2. The system as described in claim 1, wherein the means for vibrating comprises an ultrasonic transducer.

3. The system as described in claim 1, wherein the rechargeable battery is a lithium battery.

4. The system as described in claim 1, wherein the rechargeable battery is solid state polymer battery.

5. A battery charging system, comprising:
   a rechargeable battery having a rated capacity and an electrolyte that is not a liquid;
   a power supply electrically connected to the rechargeable battery for charging the rechargeable battery, and;
   means for vibrating the rechargeable battery, electrically connected to the power supply and located external to the rechargeable battery; and
   the power supply simultaneously actuating the means for vibrating and charging the rechargeable battery at a rate greater than the rated capacity of the rechargeable battery.

6. The system as described in claim 5, wherein the means for vibrating comprises an ultrasonic transducer.

7. The system as described in claim 5, wherein the rechargeable battery is solid state polymer battery.

8. A charger for charging a battery having a rated capacity and an electrolyte that is not a liquid, the charger, comprising:
   a housing;
   a power supply for charging the battery, located in the housing;
   means for connecting the battery to the power supply; and
   a vibrator carried by the housing; and
   the vibrator actuated to provide mechanical vibrations to the battery while the power supply charges the battery at a rate greater than the rated capacity of the battery.

9. The charger as described in claim 8, wherein the vibrator comprises an ultrasonic transducer.

10. A battery package, consisting essentially of;
    a housing;
    at least one rechargeable battery cell located in the housing, the rechargeable battery cell having a solid state electrolyte; and
    vibrator means located in the housing to vibrate the rechargeable battery cell.

11. The battery package of claim 10, further comprising charging contacts situated on the housing and electrically connected to the at least one rechargeable battery cell.

12. The battery package of claims 11, wherein the vibrator means is electrically connected to the charging contacts.

13. A battery discharging system, comprising:
    a battery having a rated capacity and an electrolyte that is not a liquid:
    an electrical load that draws power from the battery, electrically connected to the battery;
    a vibrating means for providing mechanical vibrations to the battery: and
    the vibrating means electrically connected to the battery and actuated when the load draws power from the battery at a rate greater than the rated capacity of the battery.

14. The system as described in claim 13, wherein the vibrating means comprises an ultrasonic transducer.

15. The system as described in claim 13, wherein the battery is vibrated at frequencies greater than 20,000 Hertz.

16. The system as described in claim 13, wherein the rechargeable battery is a lithium battery.

17. A method of charging a battery having a solid state electrolyte to provide increased capacity of the battery, the method comprising applying a charging current to the battery while vibrating the battery.

18. A method of discharging a battery having a solid state electrolyte, to provide increased capacity of the battery, the method comprising applying a load to the battery while vibrating the battery.

19. A battery package for use with portable communication devices, comprising:

a housing;

at least one battery cell having a solid state electrolyte, and located in the housing; and a vibrating means coupled to the at least one battery cell and located in the housing.

20. A battery discharging system, comprising:

a battery having a solid state electrolyte;

an electrical load that draws power from the battery, electrically connected to the battery;

a vibrating means, for providing mechanical vibrations to the battery, located external to the battery; and the vibrating means electrically connected to the battery and actuated when the load draws power from the battery.

* * * * *